US010500670B2

United States Patent
Cooper et al.

(10) Patent No.: US 10,500,670 B2
(45) Date of Patent: Dec. 10, 2019

(54) FLEXIBLE WIRE GUIDE SYSTEM

(71) Applicant: ELCo Enterprises, Inc., Jackson, MI (US)

(72) Inventors: Edward L. Cooper, Clarklake, MI (US); Steven J. Hayes, Addison, MI (US)

(73) Assignee: ELCO ENTERPRISES, INC., Jackson, MI (US)

( * ) Notice: Subject to any disclaimer, the term of this patent is extended or adjusted under 35 U.S.C. 154(b) by 8 days.

(21) Appl. No.: 15/343,783

(22) Filed: Nov. 4, 2016

(65) Prior Publication Data
US 2017/0144243 A1    May 25, 2017

Related U.S. Application Data

(60) Provisional application No. 62/251,990, filed on Nov. 6, 2015.

(51) Int. Cl.
*B23K 9/12* (2006.01)
*B23K 9/133* (2006.01)
(Continued)

(52) U.S. Cl.
CPC .............. *B23K 9/122* (2013.01); *B23K 9/124* (2013.01); *B23K 9/1336* (2013.01); *B23K 9/173* (2013.01);
(Continued)

(58) Field of Classification Search
CPC .......... B23K 9/12; B23K 9/122; B23K 9/124; B23K 9/133; B23K 9/1336
(Continued)

(56) References Cited

U.S. PATENT DOCUMENTS 2,694,130 A    11/1954    Howard
6,286,748 B1    9/2001    Cooper
(Continued)

FOREIGN PATENT DOCUMENTS

DE    102010032920    2/2012
DE    2011114262 A1    3/2013
(Continued)

OTHER PUBLICATIONS

European Search Report for EP Application No. 16197387 dated Apr. 11, 2017 in related application.

*Primary Examiner* — Dana Ross
*Assistant Examiner* — Ayub A Maye
(74) *Attorney, Agent, or Firm* — Brinks Gilson & Lione

(57) ABSTRACT

A flexible wire guide conduit includes a plurality of modules that can be chained together and can pivot and rotate relative to each other. Each module is formed of two halves that are generally mirrors of each other across a mating plane between the halves. Each module includes an upper flange and a lower flange defining a receiving cavity. Each module includes a tongue member sized to correspond to the cavity that is received in the receiving cavity. The flanges include protrusions extending into the cavity to define a pivotable axis. The tongue includes a bore that receives the protrusions of the adjacent module in the chain. The flanges each include a peg extending into the cavity. The pegs are received in slots formed in the tongue and will slide within the slots during pivoting. The pegs and slots define the degree of pivoting permitted between adjacent modules.

16 Claims, 6 Drawing Sheets

(51) Int. Cl.
  *B23K 9/173* (2006.01)
  *B65H 57/14* (2006.01)
  *H02G 11/00* (2006.01)
  *F16G 13/16* (2006.01)
  *H02G 3/04* (2006.01)

(52) U.S. Cl.
  CPC ............ B65H 57/14 (2013.01); F16G 13/16 (2013.01); H02G 11/006 (2013.01); B65H 2701/36 (2013.01); H02G 3/0475 (2013.01)

(58) Field of Classification Search
  USPC .. 219/137.44, 51, 54, 137.2, 137.51, 137.52
  See application file for complete search history.

(56) References Cited

U.S. PATENT DOCUMENTS

| | | | |
|---|---|---|---|
| 6,297,472 B1 | 10/2001 | Bong et al. | |
| 6,729,606 B1* | 5/2004 | Durin | B65H 57/14 242/615.2 |
| 8,389,901 B1 | 3/2013 | Gelmetti et al. | |
| 8,450,645 B2 | 5/2013 | Gelmetti | |
| 8,453,960 B2 | 6/2013 | Gelmetti et al. | |
| 8,505,272 B1* | 8/2013 | Komiya | H02G 11/006 248/49 |
| 9,057,420 B1 | 6/2015 | Hsieh | |
| 2005/0198937 A1 | 9/2005 | Komiya | |
| 2009/0065200 A1* | 3/2009 | Howard | B65H 57/04 166/255.1 |
| 2009/0200284 A1 | 8/2009 | Sanchez | |
| 2010/0116803 A1* | 5/2010 | Gelmetti | B23K 9/133 219/138 |
| 2011/0042355 A1 | 2/2011 | Gelmetti | |
| 2011/0132880 A1* | 6/2011 | Kossowan | B23K 9/048 219/76.14 |
| 2013/0168479 A1 | 7/2013 | Cooper | |
| 2014/0042142 A1 | 2/2014 | Gelmetti et al. | |
| 2014/0216594 A1* | 8/2014 | Mizutani | B65H 57/04 140/147 |
| 2017/0144243 A1* | 5/2017 | Cooper | F16G 13/16 |

FOREIGN PATENT DOCUMENTS

| | | |
|---|---|---|
| JP | S6089448 | 5/1985 |
| KR | 20150001970 A | 1/2015 |

* cited by examiner

US 10,500,670 B2

FLEXIBLE WIRE GUIDE SYSTEM

BACKGROUND OF THE INVENTION (1) Field of the Invention

The present invention relates to a wire guide system for use in a wire dispensing system. In particular, the present invention relates to a wire guide system that is flexible to allow the wire to be fed through the system and around a bend.

(2) Description of the Related Art

Wire dispensing systems are generally known in the art for providing a wire from a source location through a wire guide to a desired location. Wire dispensing systems of this type can be used in systems for dispensing weld wire from a wire supply source or drum toward a weld gun.

Weld guns and welding systems typically include a wire electrode in the form of a weld wire. One type of welding process is known as gas metal arc welding, also known as metal inert gas welding or metal active gas welding. In these weld processes, an electric arc is formed between the metal workpiece and the consumable wire electrode, which heats the workpiece metals, thereby causing the workpiece metals to melt and join.

The wire electrode is fed into the weld gun, along with shielding gas. The shielding gas shields the welding process from the adjacent air. The weld gun typically includes a number of components that combine to allow the wire and gas to be fed into and through the weld gun. As the wire is fed through the gun and consumed during the welding process, additional amounts of weld wire are required to continue the process.

Weld wire is typically supplied from a stationary spool or other wire supply source. Accordingly, the weld wire must travel from the stationary spool to the weld gun. The weld wire often must travel through a non-linear route from the spool to the weld gun, and therefore must make various turns and bends along the feed route. The number of bends and turns can result in friction accumulating on the wire, thereby increasing the necessary pulling or pushing force on the wire, while also resulting in wear and tear on the wire or the conduit through which the wire travels.

Additionally, the weld stations where welding occurs can vary from job to job, such that a fixed conduit for delivering the wire may be insufficient to supply weld wire from the stationary spool, thereby requiring installation of a new conduit or time consuming modification of an existing wire conduit.

Accordingly, there is a need for a wire guide system that provides reduced friction on the wire during delivery through the system, while being easily modifiable and flexible.

DETAILED DESCRIPTION OF THE INVENTION

Figure 1:
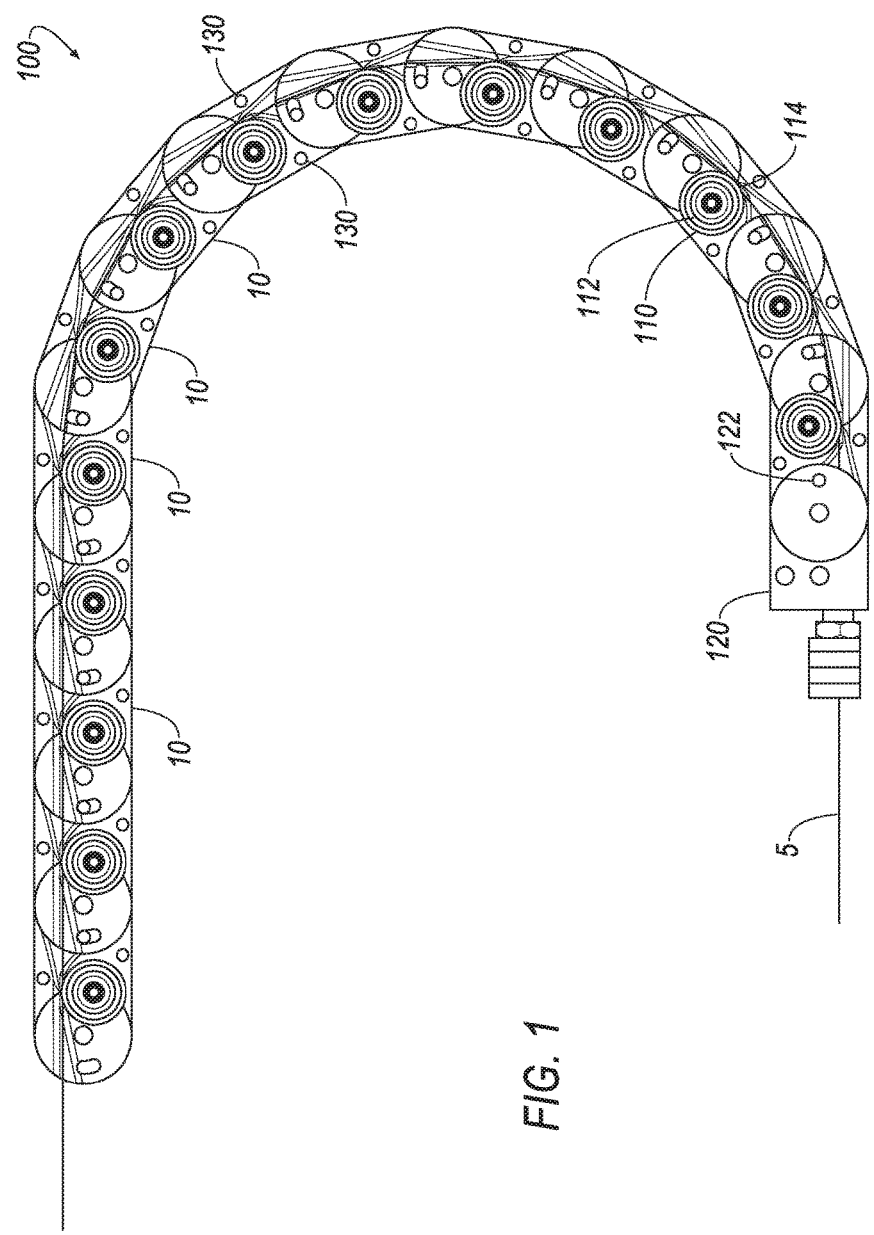
FIG. 1 is a partially transparent plan view illustrating multiple wire guide modules connected and chained together to define a flexible wire guide conduit.

FIGS. 1-9 illustrate the wire guide module 10 of the present invention. As shown in FIG. 1, the wire guide module 10 can be used with additional wire guide modules 10, in an assembled and linked state to define a wire guide assembly 100. The wire guide assembly 100 forms a part of a wire dispending system that includes a weld wire source (not shown) having a supply of weld wire 5 and a weld gun (not shown). The weld wire 5 is fed through the wire guide assembly 100 during delivery of the wire 5 to the weld gun.

Figure 2:
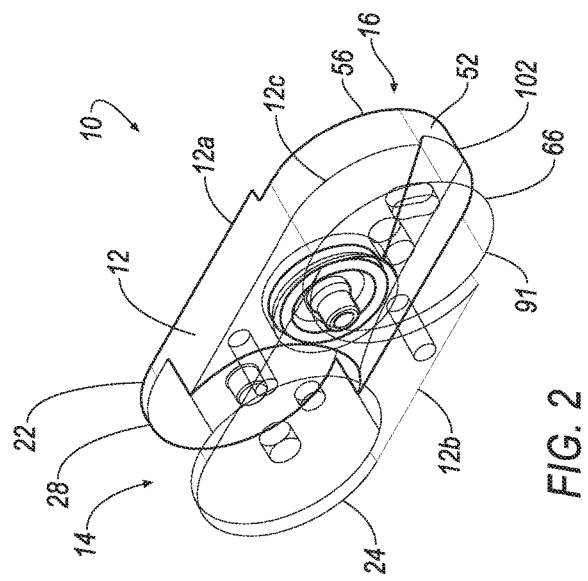
FIG. 2 is an isometric view of the module being formed by an upper half and a lower half, with the lower half being partially transparent.
Figure 3:
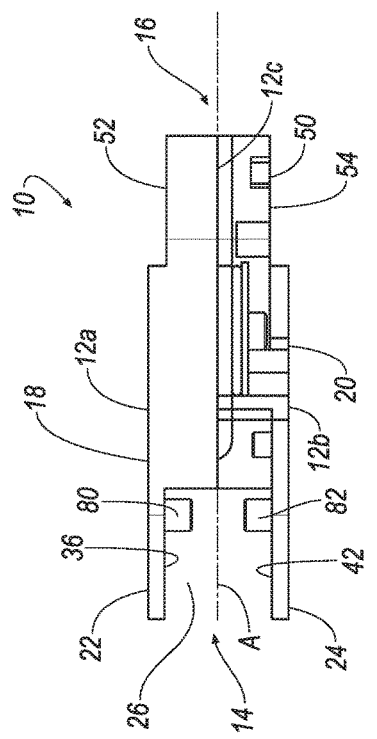
FIG. 3 is a front view of the module with the lower half being partially transparent.
Figure 4:
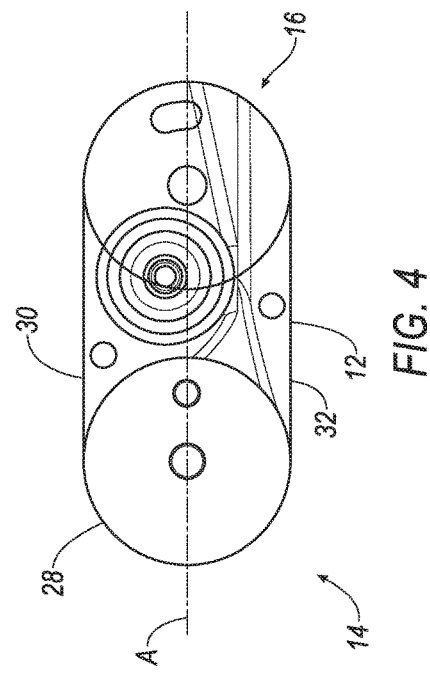
FIG. 4 is a bottom view of the module, with the lower half being transparent.

Turning now to FIGS. 2-4, the module 10 is defined by a housing or body portion 12. The body portion 12 has a first end portion 14 and a second end portion 16. The body portion 12 includes a first surface 18 and a second surface 20. As shown in the figures, the first surface 18 may be referred to as an upper surface, and the second surface 20 may be referred to as a lower surface. However, it will be appreciated that the terms "upper" and "lower" are relative to each other, and such reference is not intended to be limiting as to any particular orientation of the module; rather, the terms "upper" and "lower" are intended merely as a descriptive aid. For example, reference to the upper surface will therefore apply to the first surface 18 regardless of its orientation during use, and it will be appreciated that the orientation of the first surface 18 can change before, during, or after its use.

Similarly, references to up, down, upward, downward, or the like, are relative to the upper and lower surfaces and not intended to be limited to any particular orientation of the module 10.

The body 12 is preferably formed by two halves 12a and 12b. The halves 12a and 12b can be referred to as an upper half 12a and a lower half 12b. The upper and lower halves 12a, 12b are sized and configured to be mirror images of each other across a mating plane 12c defined by the combination of the upper and lower halves 12a, 12b. The upper half 12a therefore includes a lower mating surface, and the lower half 12b includes an upper mating surface. The upper and lower mating surfaces combine and mate to define the mating plane 12c.

The body 12 may be referred to as a combined component of both the upper and lower halves 12a, 12b herein. Additionally, the individual halves 12a and 12b may be referred to describe their respective features. Typically, each feature of the upper half 12a is present in the lower half 12b, with the positioning of each feature being the same/mirrored across the mating plane 12c.

The combination of the halves 12a, 12b can also be referred to as a clam-shell, such that when the halves 12a and 12b are pivoted open relative to each other, the features of each half 12a, 12b will be mirrored across the pivoting axis.

The first end portion 14 is disposed at an opposite end of the body 12 from the second end portion 16, with the body 12 including both the first end portion 14 and the second end portion 16. The body 12 defines a central longitudinal axis A extending between a terminal end of the first end portion 14 to a terminal end of the second end portion 16 and generally through the center of the body 12.

The first end portion 14 includes an upper flange 22 and a lower flange 24. The upper flange 22 of the first end portion 14 extends longitudinally away from the second end portion 16 and the body 12. The upper flange 22 is disposed at the first end portion 14 and can be a part of the first end portion 14. Preferably, the upper flange 22 is integral with and monolithically formed as a unitary and homogenous structure with the remainder of the upper half 12a of the body 12.

The lower flange 24 of the first end portion 14 extends longitudinally away from the second end portion and the body 12. Preferably, the lower flange 24 is integral with and monolithically formed as a unitary and homogenous structure with the remainder of the lower half 12b of the body 12.

With the body 12 being formed of the two halves 12a and 12b, the upper flange 22 is therefore part of the upper half 12a and the lower flange 24 is therefore part of the lower half 12b. The upper flange 22 and lower flange 24 will mirror each other across the mating plane 12c when the upper and lower halves 12a and 12b are assembled, and will also mirror each other when the halves 12a and 12b are pivoted open and laid side-to-side. Thus, features present in the upper flange 22 will also be included in the lower flange 24.

When the body 12 is in an assembled state, as shown in FIGS. 2-4, the upper and lower flanges 22, 24 will combine to define a receiving cavity 26. The receiving cavity 26, being defined by the mirror image upper and lower flanges 22, 24, will therefore have a defined shape that is mirrored and equivalent on both sides of the mating plane 12c that extends through and bisects the receiving cavity 26.

Figure 5:
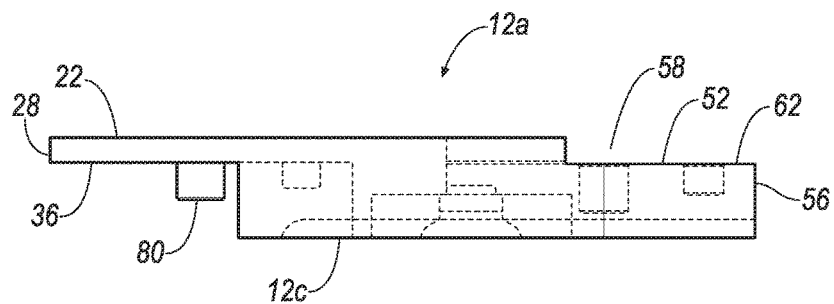
FIG. 5 is a front view of the upper half of the module.
Figure 6:
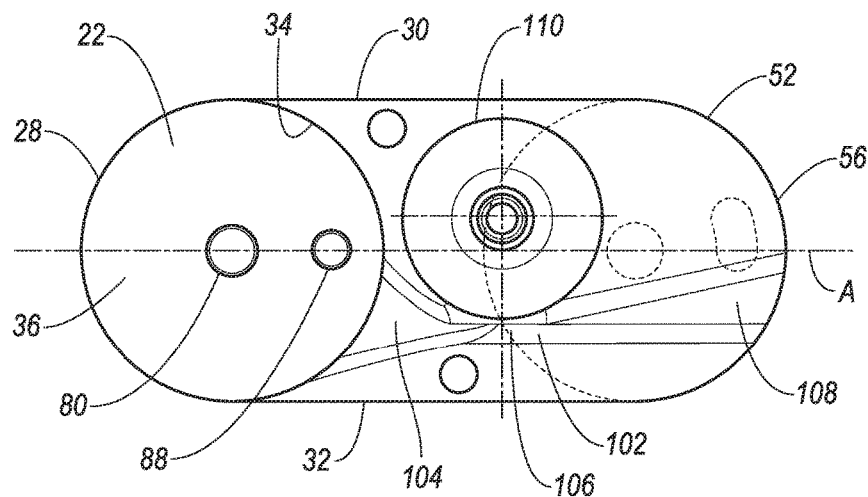
FIG. 6 is a bottom view of the upper half of the module, illustrating a protrusion and a peg.

With reference to FIGS. 5 and 6, the upper flange 22 defines a generally curved outer edge 28. The curved outer edge 28 is preferable in the form of a partial circle or semi-circle and has a defined radius. In one approach, the radius is approximately 0.75 inches. The radiused and curved edge extends from a front edge 30 of the body 12 to a rear edge 32 of the body 12, such that the width of the body 12 across the flange is approximately twice the radius of the curved edge. Thus, in one approach, the radius is 0.75 inches and the width of the body 12 is 1.5 inches.

The upper flange 22 and the upper half 12a of body 12 combine to define the shape of the upper half of the receiving cavity 26. The upper half 12a defines an inner curved surface 34. The inner curved surface 34 extends from the mating plane 12c toward the upper flange 22. The inner curved surface 34 is preferably in the form of a partial circle that is preferably a portion of a circle that is less than a full semi-circle. The inner curved surface 34 has a defined radius that is approximately the same as the radius of the outer edge 28. Thus, the outer edge 28 and inner curved surface 34 combine to define a generally circular shape.

Accordingly, the upper flange 22 defines a downward facing surface 36 having a generally circular outer profile. The downward facing surface 36 faces the mating plane 12c and defines the upper edge of the receiving cavity 26.

Figure 7:
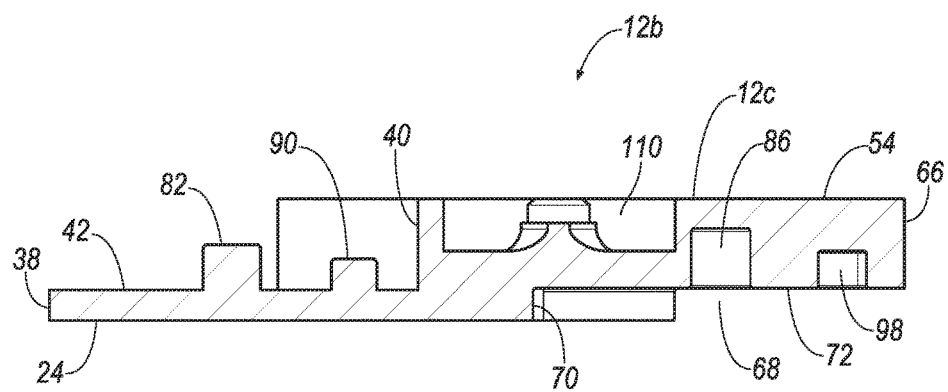
FIG. 7 is a front cross-sectional view of the lower half of the module, taken along the longitudinal axis.

Turning now to FIG. 7, the lower flange 24 defines a generally curved outer edge 38. The curved outer edge 38 is preferable in the form of a partial circle or semi-circle and has a defined radius. In one approach, the radius is approximately 0.75 inches. The radiused and curved edge extends from a front edge 30 of the body 12 to a rear edge 32 of the body 12, such that the width of the body 12 across the flange is approximately twice the radius of the curved edge. Thus, in one approach, the radius is 0.75 inches and the width of the body 12 is 1.5 inches.

The lower flange 24 and the lower half 12b of body 12 combine to define the shape of the lower half of the receiving cavity 26. The lower half 12b defines an inner curved surface 40. The inner curved surface 40 extends from the mating plane 12c toward the lower flange 24. The inner curved surface 40 is preferably in the form of a partial circle that is preferably a portion of a circle that is less than a full semi-circle. The inner curved surface 40 has a defined radius that is approximately the same as the radius of the outer edge 38. Thus, the outer edge 38 and inner curved surface 40 combine to define a generally circular shape.

Accordingly, the lower flange 24 defines an upward facing surface 42 having a generally circular outer profile. The upward facing surface 42 faces the mating plane 12c and defines the lower edge of the receiving cavity 26.

Thus, when assembled, the receiving cavity 26 is defined at the top by the downward facing surface 36, at the bottom by the upward facing surface 42, at one side by the outer edges 28 and 38 of the upper and lower flanges 22, 24, and at the other side by curved surfaces 34 and 40. The cavity 26 therefore has a generally cylindrical shape.

The cavity 26 is therefore disposed at the first end portion 14 of the body 12. The cavity 26 is sized and arranged to receive the second end portion 16 of an additional module 10, such that the modules 10 can be linked and chained together.

With reference again to FIGS. 2-4, the second end portion 16 of the body 12 is arranged similarly to the first end portion 14, such that the second end portion 16 is defined by the combination of the upper and lower halves 12a and 12b. The second end portion 16 defines a tongue member 50 that is sized and arranged to fit within the receiving cavity 26 of an additional module 10 to chain the modules 10 together.

The tongue member 50 is therefore defined by an upper tongue 52 and a lower tongue 54. The upper tongue 52 is part of the upper half 12a of the body 12, and the lower tongue 54 is part of the lower half 12b of the body 12. The upper and lower tongues 52, 54 are mirror images of each other across the mating plane 12c when the body 12 is in an assembled state, or mirror images when the upper and lower halves 12a, 12b of the body 12 are pivoted open and laid side-to-side.

Figure 8:
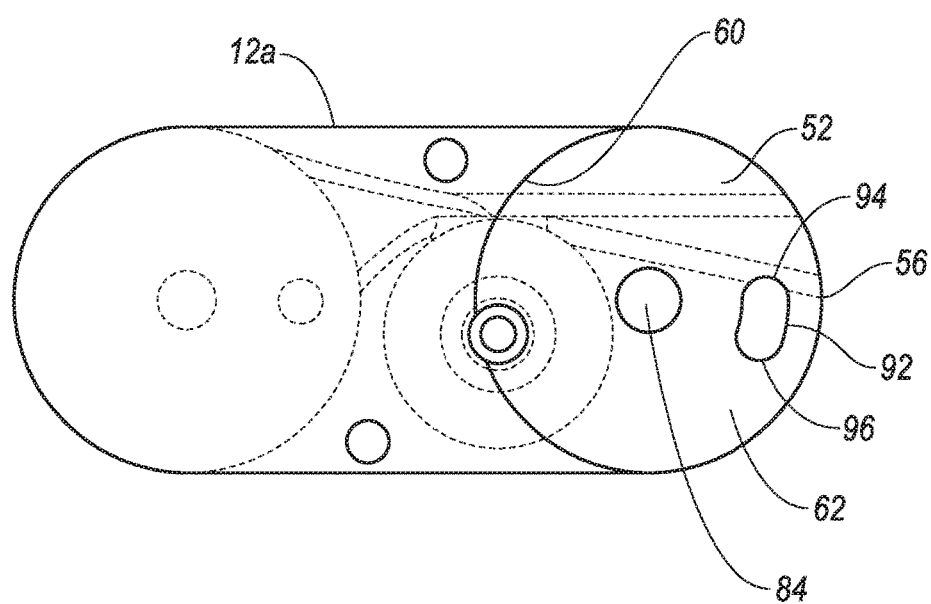
FIG. 8 is a top view of the upper half of the module illustrating a bore and a curved slot.

With reference to FIGS. 5, 6, and 8, the upper tongue 52 defines a curved outer edge 56. The curved outer edge 56 is preferably in the form of a partial circle or a semi-circle having a defined radius. The radius preferably corresponds to the radius of the inner surface 34, or can be made slightly smaller than the radius of the inner surface 34 to reduce instances of interference between the outer edge 56 and the inner surface 34 when the tongue 50 is inserted into the cavity 26.

The upper tongue 52 and the upper half 12a of the body 12 combine to define an upper recess 58. The upper half 12a of the body 12 defines a curved second inner surface 60 that extends from the upper surface of the upper half 12a downward toward the upper tongue 52. The second inner surface 60 has a radius that generally corresponds to the radius of the outer edge 56. Thus, the inner surface 60 and the outer edge 56 combine to define a generally circular profile.

The upper tongue 52 further defines an upwardly facing lower surface 62 that is defined by the outer edge 56 and the inner surface 60. Thus, the lower surface 62 has a generally circular shape.

The upper tongue 52 and upper half 12a of the body therefore combine to define the upper recess 58 having a generally cylindrical or partially cylindrical shape. The upper recess 58 is defined on the bottom by the lower surface 62, on one end by the inner surface 60, on the other end by the outer edge 56. The side of the recess 58 corresponding to the outer edge 56 is open in the direction of the outer edge 56. The top of the recess 58 is open.

The recess 58, therefore, is sized and configured to receive the upper flange 22 of the additional module 10, with the outer edge 28 of the upper flange 22 being received at the inner surface 60 that defines the recess 58. The outer edge 60 of the upper tongue 52 is similarly received at the inner surface 34 that defines the receiving cavity 26.

With reference again to FIG. 7, the lower tongue 54 defines a curved outer edge 66. The curved outer edge 66 is preferably in the form of a partial circle or a semi-circle having a defined radius. The radius preferably corresponds to the radius of the inner surface 40 that defines the receiving cavity 26, or can be made slightly smaller to reduce instances of interference between the outer edge 66 and the inner surface 40 when the tongue 50 is inserted into the cavity 26.

The lower tongue 54 and the lower half 12b of the body 12 combine to define a lower recess 68. The lower half 12b of the body 12 defines a curved second inner surface 70 that extends from the lower surface of the lower half 12b upward toward the lower tongue 54. The second inner surface 70 has a radius that generally corresponds to the radius of the outer edge 66. Thus, the inner surface 70 and the outer edge 66 combine to define a generally circular profile.

The lower tongue 54 further defines a downwardly facing upper surface 72 that is defined by the outer edge 66 and the inner surface 70. Thus, the upper surface 72 has a generally circular shape.

The lower tongue 54 and lower half 12b of the body 12 therefore combine to define the lower recess 68 having a generally cylindrical or partially cylindrical shape. The lower recess 68 is defined on the top by the upper surface 72, on one end by the inner surface 70, on the other end by the outer edge 66. The side of the recess 68 corresponding to the outer edge 66 is open in the direction of the outer edge 66. The bottom of the recess 68 is open.

The recess 68, therefore, is sized and configured to receive the lower flange 24 of the additional module 10, with the outer edge 38 of the lower flange 24 being received at the inner surface 70 that defines the recess 68. The outer edge 66 of the lower tongue 54 is similarly received at the inner surface 40 that defines the receiving cavity 26.

Thus, when the two halves 12a, 12b are assembled, the upper and lower flanges 22 and 24 will receive the tongue 50, in particular the upper and lower tongues 52 and 54. The tongue 50 is received in the receiving cavity 26, the upper flange 22 is received in the upper recess 58, and the lower flange 24 is received in the lower recess 68. An example of the modules 10 linked together is shown in FIG. 1.

The rounded or partially circular shape of the flanges 22, 24, tongues 52, 54, cavity 26, and recessed 58, 68 permit the connected modules 10 to rotate or pivot relative to each other while remaining connected, as shown in FIG. 1. More particularly, the tongue 50 is permitted to rotate within the cavity 26, and the flanges 22 and 24 are likewise permitted to rotate in the recesses 58 and 68. The generally flat nature of the surfaces that define the tops and bottoms of the cavity 26 and recesses 58 and 60 will typically limit the rotation and pivoting to a single plane.

The above described arrangement of the flanges 22 and 24 and tongue 50 illustrates how adjacent modules 10 in a chain will fit together and pivot or rotate relative to each other. The modules 10 further include additional structure that retains the modules 10 to each other in a longitudinal direction or in response to being put in tension. The modules 10 further include structures that determine the amount of rotation or pivoting relative to each other.

Turning again to FIGS. 5 and 6, the upper flange 22 includes a protrusion 80 that extends from the flange 22 in a downward direction into the cavity 26. The protrusion 80, being extending from the upper flange 22, can also be referred to as an upper protrusion, even though it extends downward from the flange 22. The protrusion 80 has a generally cylindrical shape, similar to a post. The protrusion 80 has a height such that it will extend downward from the flange 22 and terminate short of the mating plane 12c.

The protrusion 80 is disposed on the longitudinal axis of the body 12, and is also approximately centered within the cavity 26, although it may be slightly offset from the center of the cavity 26 toward the outer edge of the flange 22. The protrusion 80 is sized and positioned to be received in corresponding structure of the tongue 50.

As shown in FIG. 7, the lower flange 24 includes a protrusion 82 similar to the protrusion 80 described above. The protrusion 82 extends upward from the lower flange 24 and can be referred to as a lower protrusion.

The protrusions 80 and 82, when the body 12 is assembled, will extend toward the mating plane 12c to define a pivot axis about which the tongue 50 can pivot or rotate, as shown in FIG. 2.

With reference to FIG. 8, the upper tongue 52 includes a bore 84 that is disposed into the upper tongue 52. The bore 84 is generally circular and is sized and arranged to correspond to the size of the upper protrusion 80, or be slightly larger. Thus, the upper protrusion 80 will be received within the bore 84, allowing the tongue 50 to rotate or pivot relative to the upper flange 22. The bore 84 is disposed at the approximate center of the upper recess 58 and along the longitudinal axis. However, the bore 84 may be slightly offset toward the outer edge 56 of the upper tongue 52.

By offsetting the protrusion 80 and bore 84 slightly toward the outer edges 28 and 66, this can reduce instances of interference or friction between the tongue 50 and the inner edges of the cavity 26 that can occur due to manufacturing tolerances. Preferably, the offset of the protrusion 80 and bore 84 toward the edge is nominal such that the outer edge 56 of the tongue 50 will be close to the inner edge 34 of the cavity.

As shown in FIG. 7, the lower tongue 54 includes a bore 86 that is similar to the bore 84, being disposed into the lower tongue 54 in a similar manner. The bore 84 can be referred to as an upper bore, and the bore 86 can be referred to as a lower bore. The bore 86 receives the lower protrusion 82, allowing the tongue 50 to rotate and pivot relative to the lower flange 24. The bores 84 and 86 have been described as extending into the tongues 52 and 54, however the bores 84 and 86 could extend fully through the tongues 52 and 54 in another approach.

The interface between the protrusions 80, 82 and bores 84, 86 pivotally connects adjacent modules 10 and limits or prevents the modules 10 from being separated when in tension. The interface also allows the pivoting or rotation of linked modules 10 relative to each other along the pivot axis defined by the protrusions 80, 82, and bores 84, 86.

However, it is preferable to also limit the degree of rotation or pivoting of adjacent modules 10 relative to each other. The amount of permitted relative rotation between adjacent modules 10 can be controlled by further structure related to the flanges 22 and 24 and the tongue 50.

Figure 9:
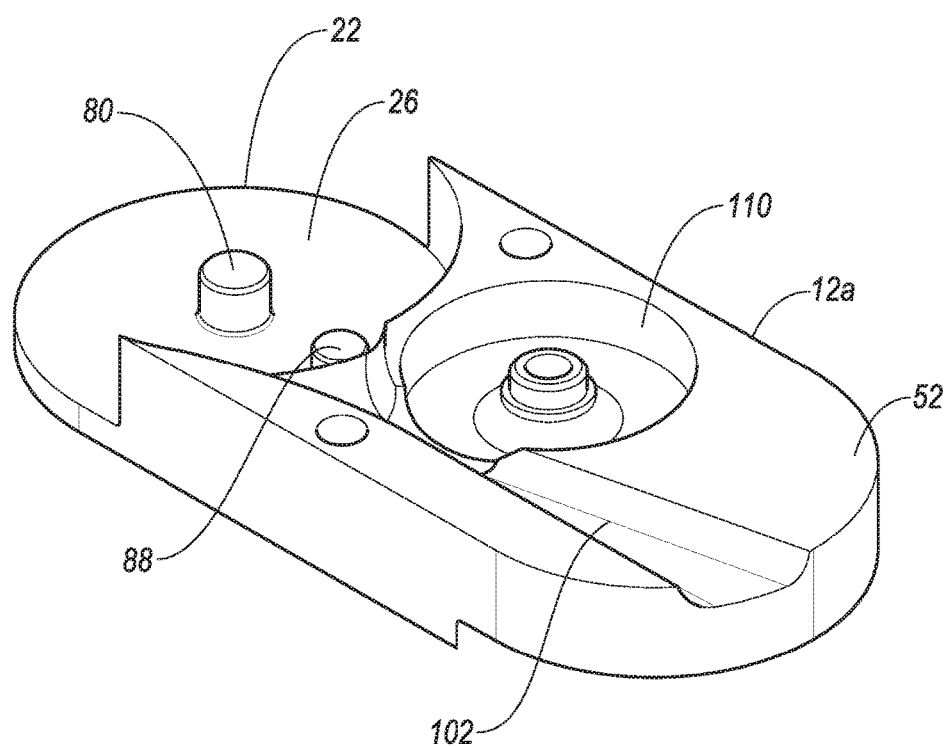
FIG. 9 is an isometric view of the top half, illustrating the top half of a channel extending through the module and the top half of a bearing cavity in which a bearing can be disposed.

As shown in FIGS. 6 and 9, the upper flange 22 includes a peg 88 that extends away from the flange 22 into the cavity 26, similar to the protrusion 80. The peg 88 can also be referred to as an upper peg. The peg 88 preferably has a shape similar to a post or cylinder; however, other shapes could also be used, such as a hemispherical shape, or even a shape with a non-circular profile.

The peg 88 is disposed on the longitudinal axis, but offset along the axis longitudinally inward relative to the protrusion 80. Put another way, the peg 88 is disposed on the axis between the protrusion 80 and the inner surface of the cavity 26.

The peg 88 preferably has a height that is smaller than the height of the protrusion 80; however, the peg 88 could also be the same height in another approach. The peg 88 is sized and arranged to be received in corresponding structure on the tongue 50.

As shown in FIG. 7, the lower flange 24 includes a peg 90 that is similar to the peg 88. The peg 90 extends upward from the lower flange 24 into the cavity 26. The peg 90 is disposed longitudinally between the lower protrusion 82 and the inner surface of the cavity 26. The peg 90 is sized and arranged to be received with corresponding structure of the tongue 50.

Preferably, the peg 88 and the peg 90 are arranged on the flanges 22 and 24 such that are mirror images of each other across the mating plane 12c. However, unlike the protrusions 80 and 90 that combine to define a pivot axis, the pegs 88 and 90 are used as follower type elements. Accordingly, in another approach, they can be disposed at different locations on their respective flanges. Thus, they can also be disposed at a location that is not on the axis.

As described above, the pegs 88 and 90 act as follower type elements and are arranged to be received in corresponding structure on the tongue 50. With reference to FIG. 8, the upper tongue 52 includes a slot 92 defined in the upper surface of the upper tongue 52. The slot 92 extends downward into the upper tongue 52. The slot 92 has a radius of curvature defined relative to the bore 84 and a width that corresponds to the width of the peg 88. The slot 92 also has a curved length, with the length defining the distance that the peg 88 can move within the slot 92 when the peg 88 is received therein. The slot 92 has a depth that generally corresponds to the height of the peg 88, and is preferably at least as deep as the height of the peg 88. However, the slot 92 could also extend fully through the upper tongue 52 in another approach.

The position of the slot 92 relative to the bore 84 corresponds to the position of the peg 88 relative to the protrusion 80. If the peg 88 is positioned inward relative to the protrusion 80, the slot 92 is positioned outward relative to the bore 84.

The slot 92 includes a first end 94 and a second end 96. The first and second ends 94 and 96 act as a stop for the peg 88 that can move within the slot 92 when received therein. Thus, the spacing and positioning of the ends 94 and 96 relative to each other defines the degree of rotation permitted between connected modules 10.

In one approach, the first end 94 of the slot 92 is disposed on one lateral side of the longitudinal axis, such that when the peg 88 is inserted within the slot 92 and abuts the first end 94, the connected modules 10 will be longitudinally aligned. Thus, the distance between the first end 94 and the axis will correspond to the radius of the peg 88 when the peg 88 is disposed on the longitudinal axis.

The second end 96 of the slot can be disposed on the other lateral side of the axis and, due to the curve of the slot 92, at a different longitudinal position than first end 94. The second end 96 will be further offset from the axis than the first end 94. The second end 96 is positioned such that when the peg 88 contacts the second end 96, the connected modules 10 will be rotated to each other at an angle. The amount of the angle depends on the length of the slot 92. The angle can be determined by measuring the curved length between the terminal ends of the slots and subtracting the diameter of the peg 88; or it can be determined by measuring the angle between points located inward from the terminal end that are an inward distance corresponding to the radius of the peg 88.

In one form of this approach, the angle permitted by the location of the second end 96 and the peg 88 is approximately 20 degrees, and the angle permitted by the location of the first end 94 and the peg 88 is approximately 0 degrees.

In another approach, the first end 94 is disposed on one lateral side of the longitudinal axis, but further from the axis that previously described approach. In this approach, the first end 94 is positioned similar to the second end 96, but preferably at a smaller angle from the axis. Thus, when the peg 88 contacts the first end 94, the connected modules 12 will be at an angle relative to straight, but in the opposite angular direction from the axis than the angle caused by the second end 96. In one form of this approach, the first end 94 is located such that the resulting angle is 5 degrees on one side of the axis, and the second end is located such that the resulting angle is 20 degrees on the opposite side of the axis. In this approach, the modules can pivot from one angular stop position, through the straight position, and to other angular stop position.

The amount of allowed pivoting can therefore be controlled by the size and shape of the slot 92. If the same modules 10 are used in a chain of modules, the overall angular turn that can be made possible by the chain can be calculated as the number of modules multiplied by the predetermined maximum angular displacement. Thus, if a 20 degree angle is used, and there are 9 modules 10, the modules could make a turn of 180 degrees.

If the first end 94 allows a 0 degree displacement, the modules 10 can combine to allow a curvature between 0 and 180 degrees when nine modules 10 are used. If the first end 94 allows a negative 5 degree displacement, the modules 10 can combine to allow a curvature between −45 degrees and 180 degrees.

The curvature could be altered in different ways, by having different allowed maximum displacements in different modules 10 within a chain of modules. The maximum angular curvature will be the combined maximum displacement of all of the connected modules 10.

The upper flange 22 and the upper tongue 52 were described above. As shown in FIG. 7, the lower tongue 54 can include a similar slot 98 for receiving the peg 90 of the lower flange 24. Preferably, the arrangement of the peg 90 and slot 98 will mirror the arrangement of the peg 88 and slot 92. However, they could be arranged in different locations and still allow the same angular displacement, as long as the peg 90 will be received in the slot 94.

When the halves 12a and 12b of the module 10 are assembled together, the module 10 will define a channel 102 extending through the module 10 for allowing the weld wire to pass therethrough, as shown in FIG. 2. The channel 102 is defined by both halves 12a and 12b, extending into the bottom of the upper half 12a and the top of the lower half 12b. With reference to the upper half 12a as shown in FIGS. 6 and 9, the channel 102 includes three portions: an inlet portion 104, a middle portion 106, and an outlet portion 108. The middle portion 108 is the narrowest portion of the channel 102 and is sized to allow the weld wire to pass therethrough. The height of the channel 102 is preferably constant along its length to keep the weld wire 5 that will pass therethrough along a generally common plane when the modules 10 are linked together.

The inlet portion 104 has a generally tapered shape or curved funnel profile. The inlet portion 104 preferably intersects the cavity 26 and is in fluid communication with the cavity 26.

The outlet portion 108 has a generally tapered shape and extends through the tongue 50, intersecting the outer edge of the tongue 50. The outlet portion 108 is thus in fluid communication with the area outside the edge of the tongue 50. When modules 10 are connected together and chained, the outlet portion 108 will feed into the inlet portion 104 of the adjacent module 10.

The tapered shapes of the inlet portion 104 and outlet portion 108 are arranged to account for the flexible nature of the chain of modules according to the permitted angular displacement. The greater the permitted angular displacement, the larger the taper desired.

The above description of the channel 102 with reference to the upper half 12a also applies to the lower half 12b, with the other half of the channel being formed by the lower half 12b in a mirrored manner across the mating plane 12c.

As shown in FIGS. 6, 7, and 9, the body 12, via the upper and lower halves 12a and 12b, defines a bearing cavity 110 that extends into the bottom of the upper half 12a and the top of the lower half 12b. The bearing cavity 110 is sized and arranged to receive a roller bearing 112 (FIG. 1) or other rotatable bearing therein. The bearing 112 preferably includes a curved outer edge 114 that aligns with the channel 102. The curved outer edge 114 defines an outer concave surface such that the weld wire 5 will ride within the curved outer edge as it passes along the bearing 112.

The channel 102, at the middle portion 106, is open to the bearing cavity 110. Thus, the curved outer edge 114 of the bearing 112 combines with the channel 102 through the opening. Accordingly, weld wire passing through the channel 102 will contact the edge 114 of the bearing 112, reducing the friction on the wire through the modules 10.

The channel 102 is preferably offset from the axis to one lateral side to account for the bending of the chain of modules 10 about the pivot points on the axis. The bearing cavity 110 is centered at a point that corresponds to the radius of the bearing and is offset from the middle portion 106 of the channel 102 the appropriate amount based on that radius. In the illustrated approach, the bearing channel 110 is on the opposite of the axis from the channel 102.

The illustrated embodiments show a single bearing cavity 110 for accommodating a single cavity. However, in some approaches, such as a conduit sized for a larger diameter weld wire, an additional bearing cavity could be included on an opposite side of the channel 102 from the bearing cavity 110. This additional cavity would house another bearing and further reduce friction. The additional cavity and bearing can be disposed directly opposite the cavity 110 and bearing 112, or it could be longitudinally offset from the cavity 110 and bearing 112.

When multiple modules 10 are assembled together and connected in a chain, the assembly of modules 10 can be configured to connect to other components of a wire dispensing system or conduit. To facilitate connection with other conduit structure, one or both of the end pieces of the chain of modules 10 can have a modified shape.

In one approach, as shown in FIG. 1, instead of having the flanges 22 and 24 with a rounded end, the flange end of the module 10 where the wire enters can be in the form of a block 120 formed by the upper and lower halves 12a, 12b. The block 120 can be formed without the cavity 26, flanges 22, 24 and protrusions 80, 82, instead having the channel 102 extend through the block 120 for attachment to other wire conduit components. The tongue 50, instead of including the slot 92, will include a circular recess 122 that corresponds to the size of the peg 88 of the adjacent module 10. Thus, the module 10 with the block 120 will not pivot relative to the adjacent module at its connection between the tongue 50 and the flanges 22 and 24 of the adjacent module 10.

In a further approach, the module 10 where the wire exits can also be modified. In this approach, the tongue end can be in the form of a block with the channel extending through the block and the block providing a connection to other conduit components. This block end would not need to include the bores because there is no flange end to connect to. It would further not need to include the slots, because there is no peg to be received.

The modules 10 can further include through holes 130, shown in FIG. 1 and throughout the various figures, extending through the upper and lower surfaces of the body 12. These through holes 130 can be used for mounting one or more of the modules 10 in the chain to other support structure of the weld operation to anchor the chain of modules 10. Multiple modules 10 can be fixed to support structure to fix a certain flexed shape or a portion of the flexed shape, as desired.

Having described the structure of the modules 10 and how they connect to each other, a description of the method of using the connected modules 10 will be provided.

The modules 10 are connected by taking the upper half 12a and lower half 12b of a first module 10 and placing them together at the mating plane 12c. The tongue 50 will be formed by the upper tongue 52 mating with the lower tongue 54. The bearing 112 is placed within the bearing cavity 110 prior to placing the halves 12a and 12b together, typically by placing the bearing 112 into the bearing cavity 110 of one of the halves, and placing the other half onto the bearing 112.

The next module 10 will then be attached to first module 10. To attach this next module, the upper half 12a of the next module 10 is placed over the upper tongue 52. The protrusion 80 will enter the bore 84, with the peg 88 entering the slot 92. The bottom half 12b is then placed over the bottom tongue 54, with the lower protrusion 82 entering the lower bore 86, and the peg 90 enters the slot 94. The tongue 50 of this module is also created. This process can be repeated to attach additional modules 10, in particular additional flanges 22 and 24 are placed over the previously assembled tongue 50 of the prior module 10.

In the case of using the module 10 with the block 120, this module 10 with the block 120 is created first to create the tongue 50 of this module 10, to which the flanges 22 and 24 of the next module are connected. The module 10 that replaces the tongue 50 with a block is attached last.

Once assembled, the wire of the system can be fed through the chain of modules 10. The wire will pass through the channel 102 and by the bearing 112, reducing the friction on the wire as it is fed through the chain of modules 10.

When the modules 10 are pivoted relative to each other, a first module 10 will pivot about the protrusions 80, 82 of the adjacent second module 10 via the bores 84, 86 of the first module 10. The pegs 88 and 90 will slide along the slots 92, 98. The pegs 88 and 90 will be stopped by the end of the slots 92 and 98, limiting the amount of pivoting or rotation based on the predetermined curved length of the slots 92 and 98. Pivoting the modules 10 in the opposite direction will cause the pegs 88 and 90 to slide in the opposite direction along the slots 92 and 98, with the pegs 88 and 90 being stopped at the opposite end of the slots 92 and 98. The modules 10 will be stopped such that they are in a straight alignment in one approach, or they may pivot past the straight alignment and be stopped at another angle that is opposite the first angle.

As wire is fed through the chain of modules 10, various forces may be exerted on the wire and the chain of modules 10. The flexible nature of the chain of modules 10 allows them to pivot and rotate in response to these forces, which reduces drag on the wire relative to a fixed and non-flexible conduit.

In the foregoing description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are here by incorporated by reference herein in their entirety, with each claim standing on its own as a separate embodiment of the present invention.

It is intended that the foregoing description be only illustrative of the present invention and that the present invention be limited only by the hereinafter appended claims.

What is claimed is:

1. A welding wire guide assembly comprising:
   a body portion having a first end portion and a second end portion and defining an upper surface and a lower surface;
   an upper flange disposed at the first end portion and extending longitudinally away from the body portion;
   a lower flange disposed at the first end portion and extending longitudinally away from the body portion;
   a receiving cavity defined between the upper flange and the lower flange and having a height defined between the upper flange and the lower flange;
   a tongue member disposed at the second end portion and extending longitudinally away from the body portion, the tongue member defining an upper surface and a lower surface and having a height that corresponds to or is less than the height of the receiving cavity;
   an upper protrusion extending downward from the upper flange into the receiving cavity;
   a lower protrusion extending upward from the lower flange into the receiving cavity, wherein the lower protrusion is aligned with the upper protrusion across the receiving cavity;
   an upper peg extending downward from the upper flange into the receiving cavity;
   a lower peg extending upward from the lower flange into the receiving cavity;
   an upper bore extending downward from the upper surface of the tongue member into the tongue member;
   a lower bore extending upward from the lower surface of the tongue member into the tongue member;
   an upper curved slot extending downward from the upper surface of the tongue member into the tongue member having a first end and a second end;
   a lower curved slot extending upward from the lower surface of the tongue member into the tongue member having a first end and a second end;
   a channel defined by the body portion and extending longitudinally through the body portion and configured to allow a weld wire to pass longitudinally therethrough; and
   wherein the channel has a tapered inlet portions that tapers down toward a roller bearing from the cavity and a tapered outlet portion that tapers out from the roller bearing through the tongue such that the channel becomes narrower as the channel extends towards the roller bearing but becomes wider as the channel extends away from the roller bearing.

2. The welding wire guide assembly of claim 1, wherein the roller bearing mounted within the body and adjacent the channel, the roller bearing being exposed to the channel and configured to bear against the weld wire that is passing through the channel.

3. The welding wire guide assembly of claim 1, wherein the tongue portion defines an upper tongue surface and a lower tongue surface, and the upper tongue surface is recessed relative to the upper surface to define an upper recess and the lower tongue surface is recessed relative to the lower surface to define a lower recess.

4. The welding wire guide assembly of claim 1, wherein the upper and lower protrusion are sized such that the upper and lower protrusion correspond to the upper and lower bore, respectively.

5. The welding wire guide assembly of claim 1, wherein the upper and lower pegs are sized such that the upper and lower pegs fit within the upper and lower curved slots, respectively.

6. The welding wire guide assembly of claim 1, wherein the longitudinal distance between the protrusions and the pegs corresponds to the longitudinal distance between the bores and the curved slots.

7. The welding wire guide assembly of claim 1, wherein the height of the channel measured in a direction corresponding to an axis of rotation of the roller bearing is generally constant.

8. The welding wire guide assembly of claim 1, wherein the welding wire guide assembly is sized and configured such that welding wire guide assembly will mate with a further welding wire guide assembly having the same size and configuration and having a first end portion and second end portion, wherein the first end portion of the welding wire guide assembly is arranged to mate with the second end portion of the further welding wire guide assembly.

9. The welding wire guide assembly of claim 1, where the body portion comprises an upper body portion and a lower body portion, wherein the upper and lower body portions are separate pieces and coupled at a central mating plane.

10. The welding wire guide assembly of claim 3, wherein the upper and lower flanges are sized such that the upper and lower flanges correspond to the upper recess and the lower recess, respectively.

11. The welding wire guide assembly of claim 8, wherein the upper and lower protrusions will fit within the bores of the further welding wire guide assembly, and the upper and lower pegs will fit within the slots of the further welding wire guide assembly.

12. The welding wire guide assembly of claim 11, wherein the further welding wire guide assembly can pivot relative to the welding wire guide assembly about an axis defined by the upper and lower protrusions, and degree of pivoting is limited by the pegs of the welding wire guide assembly sliding within the slots.

13. The welding wire guide assembly of claim 9, wherein the upper and lower body portions have a mirrored structure across the mating plane.

14. The welding wire guide assembly of claim 9, wherein the upper and lower body portions combine to define the channel.

15. The welding wire guide assembly of claim 9, wherein the roller bearing is housed within a bearing cavity defined in the body portion by the upper body portion and the lower body portion, and the bearing cavity is in fluid communication with the channel such that the roller bearing is configured to contact the weld wire passing through the channel.

16. The welding wire guide assembly of claim 9, wherein the upper and lower body portions combine to define the tongue member.

* * * * *